July 3, 1951 E. O. MARTINSON 2,559,308
COMPENSATING WEIGHING DEVICE
Filed March 18, 1946 2 Sheets-Sheet 2

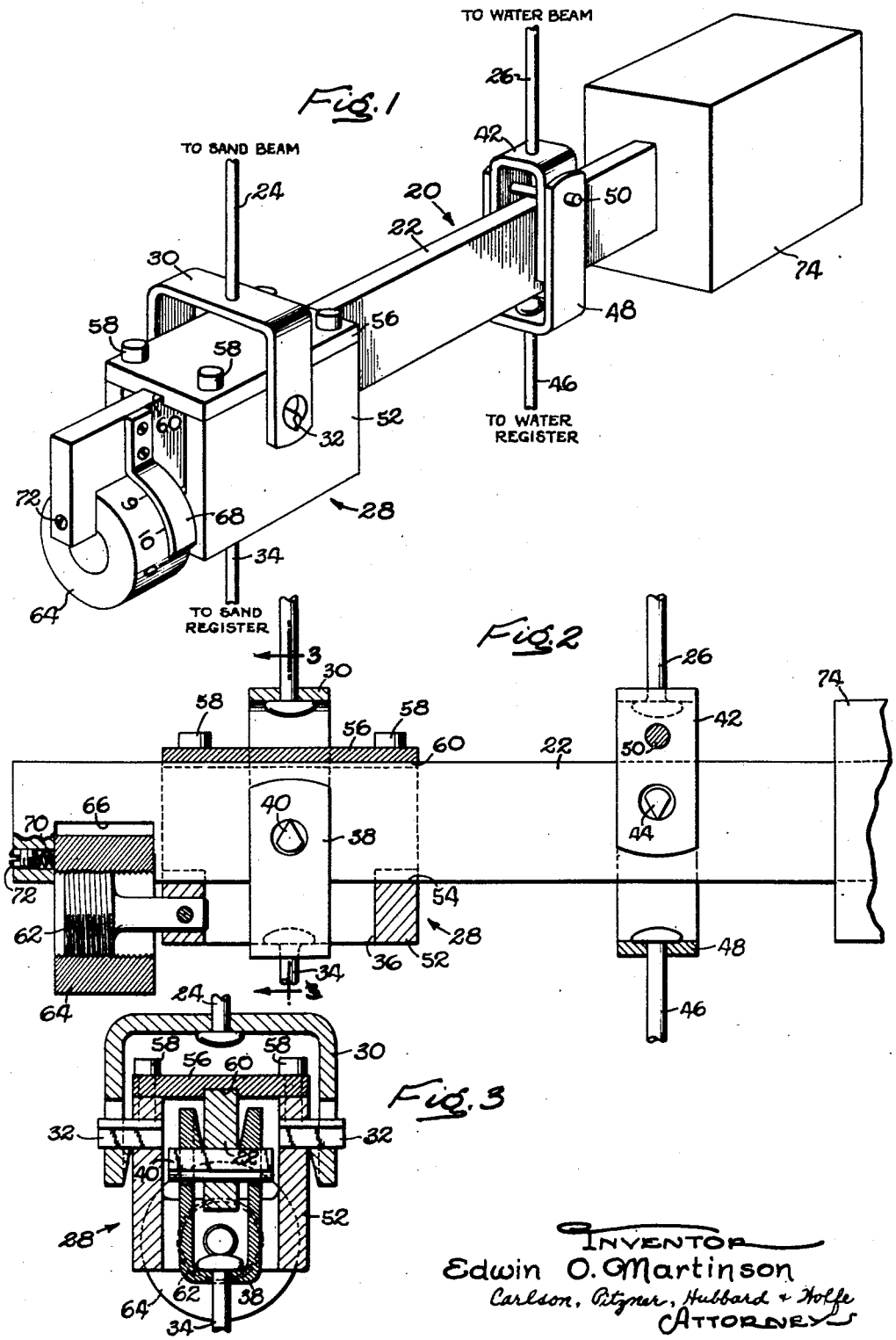

INVENTOR
Edwin O. Martinson
Carlson, Pitzner, Hubbard & Wolfe
ATTORNEYS

Patented July 3, 1951

2,559,308

UNITED STATES PATENT OFFICE 2,559,308

COMPENSATING WEIGHING DEVICE

Edwin O. Martinson, Champaign, Ill., assignor to The C. S. Johnson Company, Champaign, Ill., a corporation of Illinois Application March 18, 1946, Serial No. 655,345

16 Claims. (Cl. 265—27)

The invention relates to a compensating weighing device for use in the weighing of moisture-containing or otherwise adulterated aggregates, enabling the registration of the actual amount of aggregate and adulterant. More particularly the invention relates to a moisture compensating lever having primary but by no means exclusive utility in the accurate batching of moist fine aggregates used in the making of concrete.

The desirability of automatic compensation for the presence of moisture or similar adulterant in the weighing of a bulk ingredient is well illustrated in connection with the proportioning of ingredients for concrete. In concrete making it is necessary that the coarse and fine aggregates, water, and cement be mixed in predetermined proportions in order that the physical characteristics of the resulting concrete may be consistent and predictable. It is further necessary that the mixed concrete be of proper consistency, having a slump which is suited to the manner in which it is intended that the concrete be poured or formed. Further, because of the competitive nature of structural contracting it is necessary that a minimum of comparatively expensive cement be used while still insuring that the finished product will meet contractual requirements. A minimum of cement may be used only when the amount of dry aggregate and total moisture are accurately known. While it is true that the moisture in the sand may be compensated for by calculations based upon the ascertained moisture content, such calculation is not only time consuming but incurs considerable risk of error.

It is an object of the present invention to provide automatic means for compensating for moisture in fine aggregates which requires no calculation on the part of the operator and requires a minimum of care and attention to be exercised.

It is another object of the invention to provide apparatus to compensate for sand moisture which is simple in construction and operation, which is durable, retaining its accuracy in spite of mistreatment or prolonged use, and which is readily adjusted from time to time in accordance with the ascertained moisture content.

It is a further object of the invention to provide a compensated weighing system in which the linkages are under sufficient initial tension to eliminate play and lost motion.

It is a still further object of the invention to produce a compensating mechanism enabling the direct registering of the weight of dry aggregate and the weight of total moisture in which the moisture adjustment does not affect the zero position of the registering means.

Further objects and advantages of the invention will become apparent as the following description proceeds, taken in connection with the accompanying drawings, in which:

Figure 1 is a general perspective view of a compensating lever constructed in accordance with my invention, showing the method of attachment of the linkages leading to scale beams and registering dials.

Fig. 2 is an elevational view in partial section of the lever shown in Fig. 1.

Fig. 3 is a sectional view taken on line 3—3 of Fig. 2.

Figure 7:
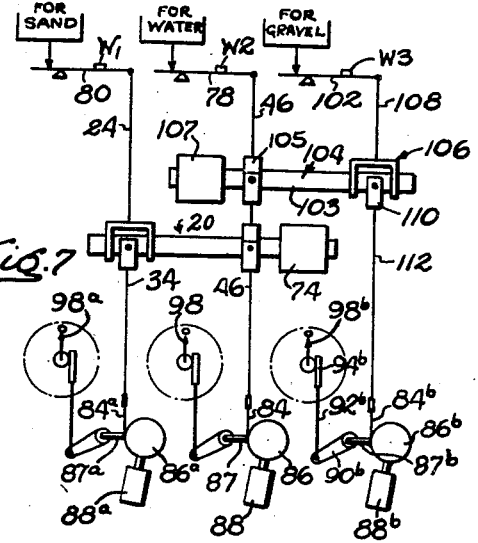

Fig. 7 discloses the use of two compensating levers arranged for simultaneous compensation of the moisture in said and fine gravel.

Figure 8:
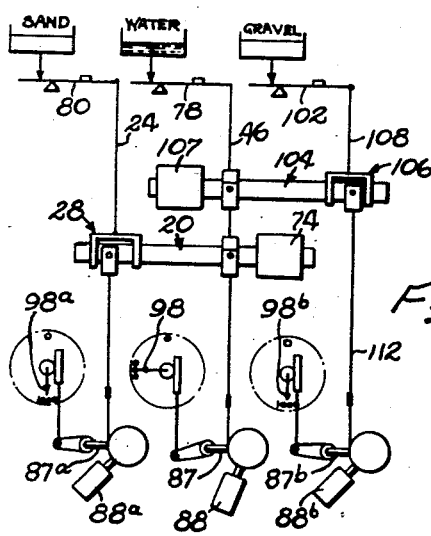

Fig. 8 shows the mechanism disclosed in Fig. 7 adjusted to compensate for 10% moisture in the sand and 5% moisture in the gravel.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the exemplary embodiment herein illustrated, the structural details of the compensating lever are shown in Figs. 1/3. The method of attachment and use is shown merely diagrammatically in Figs. 4–8 since scales for the measurement of water, sand and the like are well known in the art and since the associated counterweights and registering devices suitable for use with the lever are shown in further mechanical detail in my copending application Serial No. 655,344, filed March 18, 1946. For the present suffice it to say that the beams of the scales used in such weighing, one for each constituent, are attached to pull rods, the tug exerted on each pull rod being a measure of the weight of the material deposited on the scale. As is common practice in the art, each scale beam may be provided with an adjustable weight to compensate for the weight of the material container, being adjustable to produce a somewhat greater or less torque aboutt he fulcrum than is actually required to balance the beam with an empty container. That the latter adjustment, which will be referred to as the "tare" adjustment, is of considerable utility in connection with a compensating lever of my design will appear as the discussion proceeds.

The term "registering device" as used herein refers to any one of numerous ways in which the displacement of a linkage in a weighing mechanism may be utilized or converted into intelligible form. Examples of registering devices include dial indicators, recorders and electric limit switches (all of which are disclosed in the above copending application). Other specific forms of registration adapted to specific purposes will readily occur to those skilled in the art.

In the making of concrete batch proportions are computed on the basis of dry weights of sand and gravel and the amount of water is likewise based on dry material. The use of a compensating lever in the manner described herein results in compensating for the weight of the water in the sand so that the batcher will automatically weigh up an additional amount of wet sand to compensate for the water contained therein and will further automatically reduce the amount of water weighed up in the water batcher by the amount of water actually contained in the fine aggregates.

The necessity of such compensation is well illustrated by considering the effect of only 1% moisture content in a batch of 5000 pounds of sand. Unless compensated for, the additional 50 pounds of water in the sand will produce a marked change in the slump of the concrete and the 50 pounds of dry sand which are lacking will cause a still further change in the slump.

In compensating for the moisture in the sand I prefer to use a lever actuated by the pull rod leading to the beam of the sand scale for dividing the force in the pull rod into two component forces, one being proportional to the amount of dry sand on the scale, the other proportional to the weight of water contained in the sand. The first component is utilized to displace a counterweight associated with a sand indicating dial (or similar registering device); the second component is applied to a device for indicating or otherwise registering the amount of water. In a practical embodiment I prefer to use a water weighing scale cooperatively with the sand scale, the force from the water scale acting additionally to the water component of force from the sand scale to register the total amount of water on both scales.

The problems relating to adjustment for ascertained moisture content, the provision of initial tension without affecting the zero settings, and the method of initial adjustment arising in this type of apparatus are effectively solved in the structure to be described.

Referring now to Figs. 1–3, the compensating device is seen to take the form of a force-dividing lever mechanism indicated generally by the numeral 20. A rigid cross arm or cross bar 22 is arranged transversely to input lines or rods 24 and 26 which extend upwardly therefrom. As normally used in the batching of concrete, the rod 24 may lead to the beam of a sand weighing scale, being urged upwardly upon the deposition of sand upon the scale. The input line or rod 26 on the other hand may be coupled to the beam of a water weighing scale. Adjustably positionable along the length of the bar 22 is a box-like slide 28 which is preferably coupled to the input line 24 by means of a shackle 30 and knife edges 32 extending outwardly from the slide 28. Upward force on the input line 24 is opposed by the force in a downwardly leading rod 34 which is normally in approximate alinement with the input 24. Rod 34 extends upwardly through an aperture 36 in the box-like slide 28, being pivotally attached to the cross bar 22 by means of a shackle 38 engaging the knife edges 40.

Near the right end of the bar 22 the incoming line 26 attached to a shackle 42 engages knife edges 44 which project laterally from the cross bar 22. The force in the incoming line 26 is transmitted to the rod 46 by means of an additional shackle 48 which is pinned to the shackle 42 by means of a pin 50. Both of the downwardly leading rods 34 and 46 lead to respective devices for counterbalancing the forces therein and for registering them as weight indications. Although the latter devices may take any desired form, it will appear as the discussion proceeds that I prefer to use pendulum counterweights, the deflection of weight-indicating dials being controlled by the displacement of the pendulum shafts.

Referring to the slide 28 it will be seen that the box-like structure includes a channel member 52 which has a longitudinal internal groove 54 for slidably receiving the cross arm 22. Covering the top of the channel member 52 is a cover block 56 which is fastened to the channel by machine screws 58 or the like. Machined in the block 56 is a channel 60 which cooperates with the channel 54 in maintaining the slide in smooth sliding engagement with the cross arm 22. In the illustrated embodiment the means for adjustably positioning the slide includes a slide adjusting screw 62 pinned or otherwise fastened to the channel member and which cooperates with a manually operable adjusting nut 64. Since the nut is recessed in a slot 66 provided in the cross arm, it is thereby prevented from axial movement. If desired, the adjusting nut 64 may be provided with peripheral graduations, a selected graduation being indicated by the pointer 68. A spring 70 retained by an adjusting screw 72 serves to maintain pressure against the side of the adjusting nut 64 thereby preventing undesired turning of the nut because of shock or vibration.

In order to calibrate the slide adjustment it is merely necessary to locate and inscribe on the nut 64 a zero point corresponding to the condition of alinement between rods 24 and 34 (as illustrated in Figs. 1 and 2) and to inscribe additional graduations corresponding to the percentage of advancement of the slide 28 toward the knife edges 44 and the water pull rod 26. Assuming that the adjusting nut is subsequently set to indicate a reading of 5%, it is apparent that a given value of pull applied to the input rod 24 will be divided into a pull of 95% of such value in the rod 34, and 5% of such value in the rod 46.

In order to compensate for the weight of the cross arm 22 and the nonaxially moving parts mounted thereon and further to provide a static upward pull on line 34, an arm counterweight 74 is mounted on the end of the cross arm 22 remote from the slide 28. The method of adjustment of such counterweight is covered in the following section.

*Initial installation and adjustment*

In the preferred type of installation two primary requirements are to be kept in mind. The first of such requirements is that an initial or static pull of a nominal amount, for example 10 pounds, shall exist in the linkages associated with the force registering devices in order to remove play or backlash from the system and to accurately establish the zero point. A further requirement is that adjustment of the slide in accordance with an ascertained moisture content shall not change the zero setting of either of the registering devices. As will be more fully brought out as the discussion proceeds, the proper amount of static pull may be obtained by the adjustment of the arm counterweight 74 and a beam counterweight $W_2$ (see Fig. 5) on the beam of the water weighing scale. The second requirement may be fulfilled by adjustment of the weight of the slide in comparison to a beam counterweight $W_1$ on the beam of the sand scale.

Figure 4:
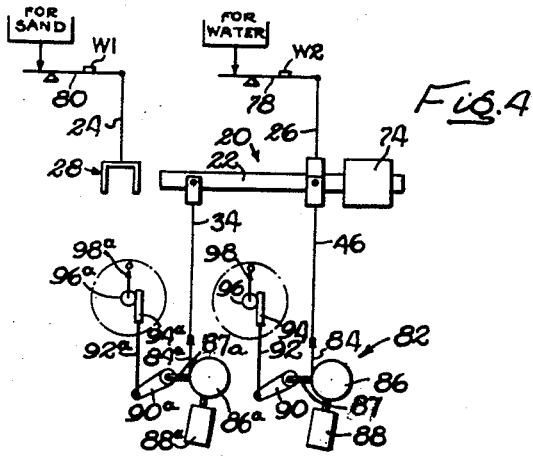
Fig. 4 is a schematic view showing the orientation of the compensating lever with respect to the remainder of the weighing apparatus during initial installation and adjustment.

Referring now to Fig. 4, the compensating lever and slide are shown out of engagement as they appear during the process of initial adjustment. The water input line 26 is shown connected to the scale beam 78 of the water scale while the sand input line 24 is connected to the beam 80 of the sand scale. The counterweights $W_1$ and $W_2$ respectively associated with the scale beams 80 and 78 may be either adjusted in magnitude or position along the beam to apply the desired static or initial tensioning to the input rods 24 and 26.

The downwardly projecting rod 46 is coupled to a water registering device indicated generally as 82. In the present embodiment the latter includes a draft band 84, a cylinder 86 about which the draft band is wrapped, and a pendulum counterweight 88. A crank 90 fixed to the drum 86 for rotation therewith serves to position a push rod 92 driving an axially movable rack 94, the position of the rack determining the position of a pinion 96 and the reading indicated by the pointer 98 on the indicator dial. It will be understood, of course, that Fig. 4 and the subsequent figures are simplified diagrammatic views and do not show the relative positioning of the parts in any amount of detail. The rotatable shaft 87 connecting the pendulum 86 and the crank 90 and the corresponding shafts 87a and 87b (Fig. 7) are shown in perspective. With regard to the detailed construction of this portion of the apparatus further reference may be had to applicant's copending application mentioned above in which the angle between the crank 90 and the rod 92 is substantially a right angle when the associated scale is empty.

In like manner the rod 34 which projects downwardly at the other end of the compensating lever controls the position of a draft band 84a, a drum 86a, a pendulum 88a, a crank 90a, a push rod 92a, a rack 94a, a pinion 96a, and an indicating dial 98a. The push rods 92 and 92a may preferably be several times as long as the cranks 90 and 90a. If desired, other types of registration may be used such as an electric limit switch or ink recorder described in the copending application referred to.

Preparatory to initial adjustment the scales are emptied of all sand and water. As a first step in the adjustment the weight of the arm counterweight 74, or alternatively the length of the lever arm of such counterweight, is increased until a desired static pull, say 10 pounds, exists in the rod 34. This causes rotation of the pendulum 88a into an angularly displaced position and determines the location of the zero point on the indicating dial 98a as shown. Next the weight $W_2$ on the water scale beam 78 is positioned along the scale beam until the desired static tension, for example 10 pounds, exists in the rod 46. Such tension will cause a displacement of the pendulum 88 and will determine the location of the zero point on the water indicating dial 98. If it is assumed that the weight of the compensating lever (minus the movable slide 28 and the screw 62) is a value W, then it will be obvious that the total static pull existing in the water input rod 26 will be equal to the weight W plus the sum of the downward forces, the latter in the present example amounting to 20 pounds.

As a third step in the process of adjustment the weight $W_1$ on the sand scale beam 80 is adjusted to cause a condition of balance to occur with the slide freely suspended as shown. The weight of the slide itself may vary over wide limits; it is merely advisable that the weight of the slide be sufficient to produce a nominal amount of initial tension in the sand input rod 24 in order to take up the lost motion which may exist in the linkages associated with the sand scale beam.

Figure 5:
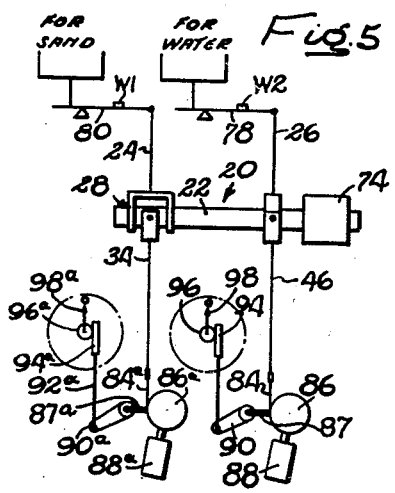
Fig. 5 is a schematic view showing the use of the compensating lever with associated scale beams and indicating dials with the compensating lever adjusted for zero moisture correction.
Figure 6:
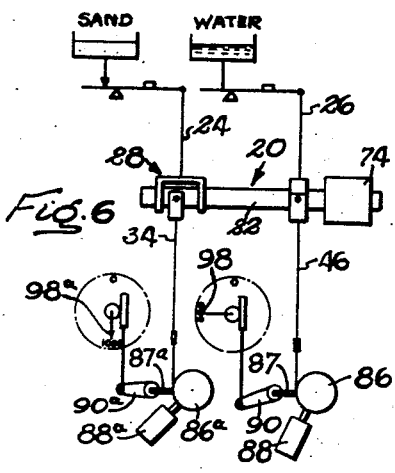
Fig. 6 shows the apparatus of Fig. 5 adjusted to compensate for 10% moisture in the sand.

Subsequent to the adjustment which has just been outline, the slide 28 is assembled on the cross arm 22 thereby producing fully assembled compensated weighing mechanism shown diagrammatically in Fig. 5. Since the weight of the slide 28 is completely counterbalanced by the sand scale beam, the slide exerts neither an upward nor a downward force on the bar 22. Consequently the slide may be adjusted to any position along the length of the bar without affecting the zero reading of either of the indicating dials 98 and 98a. It is advisable, however, either to restrict the extreme lateral motion of the slide to a relatively small amount or to provide means for laterally moving the input rod 24 in order to keep the rods 24, 26, 34 and 46 in substantial parallelism.

The indicating dials 98 and 98a may next be calibrated by applying increments of known weight to the sand and water scales, or by applying incremental forces to the input rods to simulate the effect of weights on the scales, and marking the dials accordingly.

*Manner of use*

As a typical example of the type of weighing problem quickly and automatically solved by the use of the compensating lever disclosed, let it be assumed that a given batch of concrete requires 1000 pounds of dry sand and 500 pounds of water and further that a sample of the sand to be used has been tested by any desired means and found to have a moisture content of 10%. The operator will thereupon adjust the adjusting nut 64 until the 10% index line is opposite the pointer 68. As stated above, this corresponds to an advancement of the sand input line 24 toward the water input line 26 to the extent of 10% of the distance normally existing between such input lines. Sand may now be deposited on the sand scale until the indicating dial indicates 1000 pounds. This will require 1111 pounds of the moist sand actually to be deposited on the sand scale. Simultaneously the water indicating dial will indicate a value of 111 pounds, since a predetermined portion (10%) of the force from the sand scale beam is applied to the water registering linkage through the water registering rod 46. Water is next added to the water scale until the total water indicated is 500 pounds. Because of the water indication of 111 pounds already indicated on the dial 98, the actual amount of water added to the water scale under the conditions outline is 389 pounds.

At this point it will appear obvious to one skilled in the art that the compensated weighing mechanism which has been described, while having particular applicability to the batching of materials for concrete, has general applicability for compensating for water in many other types of ingredients in addition to sand or aggregate. And although the weighing mechanism has been described with water as the adulterant, it will also be obvious that the presence of adulterants other than water may be compensated for in the same manner.

Simultaneous use of a plurality of compensating levers

For ready understanding, the weighing mechanism has been described using but a single compensating lever. It is one of the advantages of the lever structure which I disclose, however, that two or more such compensating levers may be used in a single weighing mechanism, each of the levers so used complementing the function of each of the remaining levers. The preferred method of interconnection is shown in Figs. 7 and 8. Since the majority of the components disclosed in the latter figures are included in Figs. 4–6, components already referred to will be designated by the same reference numerals. The arrangement disclosed in Figs. 7 and 8 includes an additional scale beam 102 which may for example be used for the weighing of gravel. Associated with the beam 102 is a beam counterbalancing weight $W_3$ of the same type as the corresponding weights $W_1$ and $W_2$ already referred to. An additional compensating lever 104 having a bar 103 is pivotally connected to the water rod 46 by means of a shackle 105. Mounted on the bar 103 on one side of the shackle 105 is a counterweight 107, while slidably engaging the bar 103 on the other side of the shackle is a slide 106 pivotally attached to a gravel input rod 108. A shackle 110 in substantial alinement with the input rod 108 is coupled to a gravel registering rod 112 which joins a draft band 84b wrapped around a cylinder 86b and having one end fixed thereto. A pendulum 88b and a crank 90b are fixed to the cylinder 86b and rotate therewith. Rotational movement of the crank 90b is accompanied by upward movement of a push rod 92b and a rack 94b, the latter causing rotation of a pinion 96b of an indicating dial 98b. Thus it is seen that the general arrangement of the gravel compensating lever 104 and the associated scale, linkage, and registering means is substantially identical with that used in the weighing of sand.

The method of assembly and initial adjustment is sufficiently similar to that outlined in connection with Fig. 4 that it need not be discussed in detail. Suffice it to say that the counterweight 107, after temporary removal of the slide 106 is adjusted to cause a desired (say 10 pound) initial deflection of the pendulum 88b and the associated linkage. The weight $W_2$ on the water scale beam is next adjusted so that an approximately 10 pound force will exist in the water registering rod 46. As a final step in the adjustment, the weight of the slide 106 is adjusted with respect to the counterbalancing weight $W_3$ on the scale beam so that upon reconnection of the slide 106 and the bar 103 no change in the zero point on the indicating dial 98b will result, regardless of the longitudinal positioning of the slide.

In order to exemplify the operation when two compensating levers are used, it will be assumed that a given batch requires 1000 pounds of fine dry gravel, 1000 pounds of dry sand, and 500 pounds of water. Since gravel normally contains a smaller percentage of water than the sand, it will be assumed that the ascertained water content of the gravel is 5%.

To weigh ingredients in the proportions given, the sand moisture-compensating lever 20 is adjusted for the ascertained moisture content of the sand, for example 10%, and the gravel moisture-compensating lever 104 is adjusted for a 5% correction. Since a predetermined portion of the forces exerted by the beams of the sand and gravel scales (10% and 5% respectively) is diverted and applied to the water registering mechanism, it is necessary to use 1111 pounds of sand, and 1052 pounds of gravel to produce readings of 1000 pounds on the sand and gravel indicating dials. Because of the resultant 163 pound "predeflection" of the water indicating dial, it will be necessary under the conditions stated merely to add 337 pounds to the water scales to produce a 500 pound reading.

In a like manner additional compensating levers may be added to the system to compensate for the moisture contained in the coarser aggregates. Each additional compensating lever employed should, of course, engage the pull rod leading from the beam of the water weighing scale.

It will be apparent from the above discussion that the weights of the slide and the arm counterweight are utilized to obtain initial tensioning of the linkages both to remove play and lost motion and to more accurately determine the point of zero weight on the indicating dials. It will be apparent that the invention also contemplates the use of a compensating lever solely in the role of a force-dividing lever. The lever arm 20 may, for example, be mounted to engage horizontal rather than vertical pull rods, in which case the lever would pivot in a horizontal rather than in a vertical plane. In the latter application the lever would function to divide the force exerted by the sand scale into a sand component and a water component. The latter is illustrated in Figs. 1 and 2, considering the lever 20 shown therein to be lying on its side. Regardless of the manner in which the compensating lever is mounted or used it is desirable that no transverse force be applied to the bar 22 by the slide 28 under conditions of zero weight on the sand scale. If the latter condition were not met, longitudinal adjustment of the slide would obviously change the torque acting on the lever and thus change the zero position of the indicating dial.

It will appear to one skilled in the art that the device described herein may be used simply to provide a direct reading of the amount of dry material and the amount of water in a material being weighed on the sand scale. It is also obvious that various auxiliaries such as remote indication or adjusting devices may be used in conjunction with the compensating lever for adapting it to specific purposes or for use with specific linkage arrangements without departing from my invention.

It will be understood that in the claims which follow the term "pull rod" is a general term applied to the members (for example members 24 and 26 of Fig. 1) employed for transmitting forces from the scale beams to the compensating lever.

I claim as my invention:

1. A compensator for use with sand and water measuring devices of the type producing a force proportional to the quantity being measured comprising: a compensator bar, a water input rod perpendicularly engaging said bar at one end thereof, a sand input rod perpendicularly engaging said bar at the other end thereof, said rods being arranged for actuation respectively by said measuring devices and for transmitting the forces exerted thereby, a water registering rod engaging said bar and in opposed relation to said water input rod, a sand registering rod engaging said bar and in opposed relation to said sand input rod, means associated with said registering rods for respectively registering the forces therein, means for positionally adjusting at least one of said rods along said bar in a direction to decrease the sand registration and increase the water registration and to an extent dependent upon the ascertained moisture content of said sand thereby to register the quantity of dry sand and the total quantity of water.

2. The combination, with scale beams for weighing adulterant-containing aggregates and registering devices coupled thereto for registering in accordance with respectively applied tensile forces, of means including a compensating lever and pull rods coupled to said scale beams and to said compensating lever for dividing the forces exerted by said scale beams respectively into an aggregate component and an adulterant component corresponding to the ascertained proportions of adulterant in said aggregates, an adulerant registering device and means for applying said aggregate components to said aggregate registering devices and said adulerant components additively to said adulterant registering device for producing registration of the weights of pure aggregate and total adulterant.

3. In a device for use with a scale beam for registering the dry weight of an aggregate having an ascertained moisture content, the combination comprising: a compensator bar, means including a pivot for pivotally supporting said bar, means for connecting said scale beam to said pivoted bar at a point spaced from the pivot, registering means having a movable element deflecting in accordance with the force applied thereto, means for connecting said movable element to said pivoted bar at a point spaced from the pivot, and means for adjustably positioning at least one of said connecting means along said bar, said positioning means being so adjusted that the ratio of the length of the lever arm associated with said beam to the length of the lever arm associated with said registering means equals the proportion of dry aggregate in a given sample of moist aggregate.

4. A compensating bar for coupling the beams of scales for the weighing of moist sand and water with respective pendulous counterweights, comprising: a rigid cross arm, two parallel input rods attached to said beams respectively, two parallel output rods associated with said counterweights in opposed relation to said input rods respectively, means including a first pivot located on said cross arm near one end thereof for connecting the input rod associated with said water scale with the associated output line, means including a second pivot for connecting the other of said output rods to said bar at a point remote from said first pivot, an adjustably positioned slide, means including a third pivot for connecting the input rod associated with said sand scale to said slide, means for adjusting said slide along said cross arm in accordance with an ascertained percentage of moisture in said sand thereby to cause displacement of said counterweights in accordance with the respective weights of dry sand and total water on said scales.

5. A compensating lever for coupling two input rods from weighing scales with respective output rods leading to weight registering devices, comprising: a cross arm, means including a first pivot for attaching one of said input rods and one of said output rods to a point near one end of said cross arm, means including a second pivot for attaching the other of said output rods to said cross arm at a point remote from said first pivot, a slidable sleeve arranged for endwise movement on said cross arm, means including a third pivot for connecting the other of said input rods to said sleeve, said sleeve surrounding said second pivot and having an aperture in the wall thereof for admission of the output rod associated with said second pivot.

6. In a weighing device having scale beams for weighing moist sand and water respectively and having registering means for registering the weight of dry sand and total water respectively, the combination comprising: means including a first rotatable shaft and a first pendulous counterweight mounted thereon for counterbalancing the force exerted by the beam of said water scale, vertical pull rod means actuated by the beam of the water scale for angularly displacing said pendulous counterweight, a compensating arm having a first pivot intermediate its ends allowing movement of said arm in a vertical plane, said arm being supported from said veritcal pull rod by means of said pivot, an arm counterweight mounted on said compensating arm on one side of said pivot, means including a second rotatable shaft and a second pendulous counterweight mounted thereon, second vertical pull rod means for deflecting said second pendulous counterweight and pivotally connected to said compensating arm at the opposite end of said arm from said arm counterweight, third vertical pull rod means actuated by the beam of the sand scale and normally engaging said compensating arm in substantial alinement with said second pull rod, means for adjustably positioning said third pull rod means along said arm in the direction of said pivot an amount proportional to the ascertained moisture content of said sand, said registering means being respectively controlled by the angular displacement of said first and second rotatable shafts.

7. In a weighing device having scale beams for weighing moist sand and water respectively and having registering means for registering the weights of dry sand and the total water respectively, the combination comprising: means including a first rotatable shaft and a first pendulous counterweight mounted thereon for counterbalancing the force exerted by the beam of said water scale, a vertical pull rod actuated by the beam of the water scale for deflecting said pendulous counterweight, a compensating arm having a first pivot intermediate its ends allowing movement in a vertical plane, said compensating arm being supported from said vertical pull rod by means of said pivot, an arm counterweight mounted on said compensating arm on one side of said pivot, means including a second rotatable shaft and second pendulous counterweight mounted thereon, a second vertical pull rod for deflecting said second pendulous counterweight and pivotally connected to said compensating arm at the opposite end of said arm from said arm counterweight, a third vertical pull rod actuated by the beam of the sand scale and normally engaging said compensating rod in adjustable alinement with said second pull rod, a slide for adjustably positioning said third pull rod along said arm in the direction of said pivot an amount proportional to the ascertained moisture content of said sand, said slide being of such weight as to be counterbalanced by said sand scale beam to apply no upward or downward force to said compensating arm when the sand scale is empty, said weight registering means being respectively controlled by the angular displacement of said first and second rotatable shafts.

8. In a device having scale beams for the respective weighing of two materials, the combination comprising: rotatable shafts, pendulous counterweights on said shafts respectively, vertical pull rod means actuated by the beams of said scales respectively and extending downwardly toward said pendulous counterweights for angularly displacing the same, a cross arm bridging said pull rod means and in pivotal engagement therewith, an arm counterweight located at an end of said arm remote from the points of pivotal engagement, said arm counterweight producing an initial tensioning of the more remote of said pull rods against its associated counterweight.

9. In a weighing device having scale beams for weighing moist sand and water respectively and having registering means for registering the weight of dry sand and total water respectively, the combination comprising: means including a first rotatable shaft and a first pendulous counterweight mounted thereon for counterbalancing the force exerted by the beam of said water scale, vertical pull rod means actuated by the beam of the water scale for angularly displacing said pendulous counterweight, a compensating arm having a first pivot intermediate its ends allowing movement in a vertical plane, said arm being supported from said vertical pull rod by means of said pivot, means including a second rotatable shaft and a second pendulous counterweight mounted thereon, a second vertical pull rod for deflecting said second pendulous counterweight and pivotally connected to said compensating arm at a point remote from said pivot, a third vertical pull rod actuated by the beam of the sand scale and normally engaging said compensating rod in substantial alinement with said second pull rod, means for adjustably positioning said third pull rod along said arm in the direction of said pivot an amount proportional to the ascertained moisture content of said sand, and means providing an upward force of constant magnitude for applying initial tension to said second pull rod to preload said second counterweight, said registering means being respectively controlled by the angular displacement of said first and second rotatable shafts.

10. A compensated weighing mechanism for use with a scale beam for weighing moist aggregate and with devices to register the amounts of moisture and dry aggregate, the combination comprising: a lever having pivots near the ends thereof, means including pivotally mounted pendulums for controlling said registering devices respectively, means including pull rods connected to said pivots and said pendulums for displacing said pendulums, a slide adjustably positioned on said lever in accordance with the ascertained moisture content of the aggregate, a linkage for connecting said scale beam with said slide, means for counterbalancing the weight of said slide so that said slide exerts no force on said lever with no aggregate on said scale, and means including a counterweight for subjecting said pull rods to predetermined initial tension to take up lost motion and to determine the zero settings of said registering devices.

11. In a compensating weighing mechanism for use with scale beams for the weighing of a plurality of moisture containing aggregates and water and having means for registering the dry weights of said aggregates and total water respectively, the combination comprising: pull rods associated with each of said scale beams and extending downwardly in parallel arrangement, compensating levers transversely arranged with respect to said pull rods, one end of each of said compensating levers engaging the pull rod associated with said water scale, means including pendulous counterweights for positioning said registering means, means for coupling the remaining ends of each of said compensating levers and said water pull rod to said pendulous counterweights resepctively, and slides on said compensating levers respectively connected to the pull rods leading from said aggregate scale beams, said slides being of a weight just sufficient to counterbalance the tare of said aggregate scale beams respectively, and respectively positionable along said levers in accordance with the ascertained moisture content of the respective aggregates.

12. In a mixing plant having scale beams for the weighing of moist sand and water respectively and registering devices registering in accordance with respectively applied tensile forces, the combination comprising a first force-transmitting member coupled to said sand scale beam, means including a force-dividing lever pivotally engaged by said force-transmitting member for dividing the force exerted by said beam into two component forces in proportion to the ascertained moisture content of the sand, means operatively connected to said lever for applying said component forces to the said and water-registering devices respectively, and means including a second force-transmitting member coupled at one end to said water scale beam and the other end to the water-registering device for applying to said water-registering device a force which is arithmetically additive to the component force applied thereto by said force-dividing lever.

13. In a weighing device having scale beams for the weighing of a body of adulterant-containing material and pure adulterant respectively, the combination comprising registering devices having an element therein displaced in proportion to the respectively applied tensile forces, means including a force-dividing lever mechanically coupled at a point intermediate its ends to the scale beam associated with the adulterant-containing material for dividing the force exerted by such beam into two component forces corresponding to the ascertained proportion of adulterant, force transmitting members connected to said lever on respective sides of said point of coupling for applying said component force to the material and adulterant registering devices respectively, and means including a force transmitting member mechanically coupled to the scale beam associated with the pure adulterant for applying to the adulterant registering device the force exerted by the latter-mentioned beam in a direction complementary to said component of force corresponding to the ascertained proportion of adulterant so that the forces actuating said adulterant registering device are arithmetically additive.

14. In a compensating weighing mechanism for use with scale beams for the weighing of a plurality of moisture-containing aggregates and water respectively, the combination comprising: pull rods associated with each of said scale beams and extending in parallel arrangement, compensating levers transversely arranged with respect to said pull rods, one end of each of said compensating levers engaging the pull rod associated with said water scale, means for registering the dry weights of said aggregates and total water respectively, said registering means including biased counterbalancing members, means for coupling the remaining ends of each of said compensating levers and said water pull rod to said counterbalancing members respectively, and slides on said compensating levers respectively connected to the pull rods leading from said aggregate scale beams, said slides being of a weight just sufficient to counterbalance the aggregate scale beams respectively when the latter are empty and being respectively positionable along said levers in accordance with the ascertained proportion of moisture by weight in the respective aggregates.

15. In a compensating weighing mechanism for use with scale beams for the weighing of a plurality of moisture-containing aggregates and water, the combination comprising input force transmitting members associated with each of said scale beams and extending in parallel arrangement, compensating levers transversely arranged with respect to said force transmitting members, one end of each of said compensating levers engaging the force transmitting member associated with said water scale beam with the remaining ends respectively engaging the force transmitting members associated with the aggregate scale beams, registering devices including a biased counterbalancing member for each of said scale beams, output force transmitting members for coupling the remaining ends of each of said compensating levers and the force transmitting member associated with said water scale beam to the respective biased counterbalancing members and in general alinement respectively with corresponding ones of said input force transmitting members, and means on said compensating levers for enabling limited lateral offset of the generally alined force transmitting members to cause a predetermined proportion of the force exerted by the aggregate scale beams to be applied to the water registering device.

16. In a compensating weighing mechanism for use with scale beams for the weighing of a moisture-containing aggregate and water, the combination comprising input force transmitting members associated with each of said scale beams and exerting forces along parallel lines of action, a compensating lever transversely arranged with respect to the lines of action of said force transmitting members, said compensating lever engaging the force transmitting members associated with said scale beams at spaced points, registering devices including a biased counterbalancing member for each of said scale beams, output force transmitting members for coupling said compensating lever to the respective biased counterbalancing members, said input and output members being in general alinement respectively, and means on said compensating lever for enabling limited lateral offset of the generally alined force transmitting members associated with said aggregate beam scale and the registering device for the latter to cause a predetermined proportion of the force exerted by the aggregate scale beam to be applied to the water registering device.

EDWIN O. MARTINSON.

REFERENCES CITED

The following references are of record in the file of this patent:

UNITED STATES PATENTS

| Number | Name | Date |
|---|---|---|
| 36,828 | Barker | Nov. 4, 1862 |
| 2,398,643 | Jerome | Apr. 16, 1946 |

FOREIGN PATENTS

| Number | Country | Date |
|---|---|---|
| 400,455 | England | Oct. 26, 1933 |